United States Patent
Oroskar (10) Patent No.: US 8,644,178 B1
(45) Date of Patent: Feb. 4, 2014

(54) TRANSMISSION OF CHANNEL ASSIGNMENT MESSAGES BASED ON WIRELESS COVERAGE AREA CHARACTERISTICS

(75) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 327 days.

(21) Appl. No.: 13/010,387

(22) Filed: Jan. 20, 2011

(51) Int. Cl.
*H04W 28/04* (2009.01)

(52) U.S. Cl.
USPC ........... 370/252; 370/329; 370/229; 370/351; 370/338; 370/333; 370/331; 455/436

(58) Field of Classification Search
USPC ......... 370/329, 229, 351, 333, 331, 328, 310; 455/436
See application file for complete search history.

(56) References Cited

U.S. PATENT DOCUMENTS

| | | | |
|---|---|---|---|
| 5,369,681 A | 11/1994 | Boudreau et al. | |
| 5,778,319 A | 7/1998 | Sawaki | |
| 5,787,347 A | 7/1998 | Yu et al. | |
| 5,974,327 A | 10/1999 | Agrawal et al. | |
| 5,978,463 A | 11/1999 | Jurkevics et al. | |
| 6,069,871 A | 5/2000 | Sharma et al. | |
| 6,181,945 B1 | 1/2001 | Lee | |
| 6,185,421 B1 | 2/2001 | Alperovich et al. | |
| 6,223,042 B1 | 4/2001 | Raffel | |
| 6,243,590 B1 | 6/2001 | Reddy et al. | |
| 6,289,227 B1 | 9/2001 | Shi | |
| 6,295,451 B1 | 9/2001 | Mimura | |
| 6,549,787 B1 | 4/2003 | Ravi | |
| 6,556,831 B1 | 4/2003 | Buppelmann | |
| 6,643,520 B1 | 11/2003 | Park et al. | |
| 6,745,039 B1 | 6/2004 | Di Lalla | |
| 6,907,245 B2 * | 6/2005 | Ohlsson et al. | 455/442 |
| 6,922,561 B2 | 7/2005 | Chen et al. | |
| 6,963,750 B1 | 11/2005 | Cheng et al. | |
| 7,065,361 B1 | 6/2006 | Fortuna | |
| 7,099,689 B2 | 8/2006 | Bahl et al. | |
| 7,177,658 B2 | 2/2007 | Willenegger et al. | |

(Continued)

FOREIGN PATENT DOCUMENTS

EP     2244502     10/2010
WO    WO 01/47287   6/2001

OTHER PUBLICATIONS

U.S. Appl. No. 11/499,581, filed Aug. 4, 2006.

(Continued)

*Primary Examiner* — Charles C Jiang
*Assistant Examiner* — Deepa Belur (57) ABSTRACT

A radio access network (RAN) may limit the number of channel assignment messages that it transmits to a wireless communication device (WCD) when the quality of one or more wireless coverage areas available to the WCD is impaired. For example, if the paging channel utilization of a given wireless coverage area is high, or if the WCD receives a signal strength from the given wireless coverage area that is low, the RAN may refrain from transmitting a channel assignment message via the given wireless coverage area. Similarly, if the aggregate paging channel utilization of a plurality of such wireless coverage areas is high, or if the WCD receives an aggregate signal strength from the one or more wireless coverage areas that is high, the RAN may transmit channel assignment messages via a limited number of wireless coverage areas.

19 Claims, 6 Drawing Sheets

(56) References Cited

U.S. PATENT DOCUMENTS

| | | |
|---|---|---|
| 7,260,415 B1 | 8/2007 | Oh |
| 7,317,706 B1 | 1/2008 | Hao et al. |
| 7,317,920 B2 | 1/2008 | Rajkotia et al. |
| 7,349,699 B1 | 3/2008 | Kelly et al. |
| 7,366,526 B2 | 4/2008 | Zhang et al. |
| 7,471,654 B2* | 12/2008 | Mueckenheim et al. ..... 370/329 |
| 7,853,260 B2* | 12/2010 | Holma et al. ................. 455/443 |
| 8,254,981 B2* | 8/2012 | Dwyer et al. .................. 455/525 |
| 2001/0034233 A1 | 10/2001 | Tiedemann, Jr. et al. |
| 2003/0078046 A1* | 4/2003 | Seo ............................... 455/436 |
| 2004/0002340 A1* | 1/2004 | Lim et al. ..................... 455/450 |
| 2004/0037264 A1 | 2/2004 | Khawand |
| 2004/0087305 A1 | 5/2004 | Jiang et al. |
| 2004/0125768 A1 | 7/2004 | Yoon et al. |
| 2004/0192306 A1 | 9/2004 | Elkarat et al. |
| 2004/0252669 A1 | 12/2004 | Hosein |
| 2005/0164718 A1 | 7/2005 | Rajkotia et al. |
| 2005/0233746 A1* | 10/2005 | Laroia et al. .................. 455/436 |
| 2006/0058056 A1 | 3/2006 | Das et al. |
| 2006/0094423 A1 | 5/2006 | Sharma et al. |
| 2006/0116125 A1 | 6/2006 | Buckley et al. |
| 2006/0142032 A1 | 6/2006 | Derakhshan et al. |
| 2006/0142051 A1 | 6/2006 | Purnadi et al. |
| 2006/0160551 A1 | 7/2006 | Matoba et al. |
| 2006/0274685 A1 | 12/2006 | Johnson et al. |
| 2007/0053336 A1 | 3/2007 | Petrovic et al. |
| 2007/0105535 A1 | 5/2007 | Jacobson et al. |
| 2007/0173252 A1 | 7/2007 | Jiang |
| 2007/0232330 A1 | 10/2007 | Ranganathan |
| 2008/0025235 A1 | 1/2008 | Mahany et al. |
| 2008/0032713 A1 | 2/2008 | Yang |
| 2008/0081623 A1 | 4/2008 | Burgan et al. |
| 2008/0096520 A1 | 4/2008 | Benco et al. |
| 2008/0153495 A1* | 6/2008 | Ogami et al. ................. 455/436 |
| 2008/0233945 A1 | 9/2008 | Gummadi et al. |
| 2008/0293419 A1 | 11/2008 | Somasundaram et al. |
| 2008/0293437 A1 | 11/2008 | Ranganathan et al. |
| 2009/0016328 A1 | 1/2009 | Peisa et al. |
| 2009/0061854 A1 | 3/2009 | Gillot et al. |
| 2009/0247137 A1 | 10/2009 | Awad |
| 2009/0285113 A1 | 11/2009 | Yavuz et al. |
| 2010/0061337 A1* | 3/2010 | Hallenstal et al. ............ 370/331 |
| 2010/0120437 A1 | 5/2010 | Foster et al. |
| 2010/0246532 A1* | 9/2010 | Olvera-Hernandez et al. ............................ 370/331 |
| 2010/0268674 A1 | 10/2010 | Dwyer et al. |
| 2010/0311420 A1 | 12/2010 | Reza et al. |
| 2011/0021195 A1 | 1/2011 | Cormier et al. |
| 2011/0021197 A1 | 1/2011 | Ngai |
| 2011/0034167 A1 | 2/2011 | Ben-Shaul et al. |
| 2012/0157101 A1* | 6/2012 | Uemura et al. ............... 455/436 |
| 2012/0213123 A1* | 8/2012 | Futaki ........................... 370/254 |
| 2012/0282931 A1* | 11/2012 | Giustina et al. .............. 455/437 |
| 2012/0314676 A1* | 12/2012 | Koo et al. ..................... 370/329 |

OTHER PUBLICATIONS

Cai, L. et al., "Mitigating DoS Attacks on the Paging Channel by Efficient Encoding in Page Messages," In: Proceedings of 5th International ICST Conference on Security and Privacy in Communication Networks (SecureComm 2009), Sep. 2009.

Hasswa et al., "Generic Vertical Handoff Decision Function for Heterogeneous Wireless Networks," IFIP Int. Conf. Wireless and Optical Communications Network (WOCN), pp. 239-243 (Mar. 6, 2005).

International Search Report and Written Report for PCT/US2012/028070 mailed May 7, 2012, 15 pages.

NTT DoCoMo et al., "IDLE Mode Mobility Control Principles," 3GPP TSG RAN WG2 #59BIS; 3GPP Draft; R2-074001, 8 pages, Oct. 8-12, 2007.

NTT DoCoMo et al., "Load Balancing Solutions for LTE," 3GPP TSG RAN WG2 #58bis; 3GPP Draft; R2-072719, 5 pages, Jun. 22, 2007.

Oroskar et al., U.S. Appl. No. 12/853,730, filed Aug. 10, 2010, 48 pages.

Oroskar, Siddharth S., U.S. Appl. No. 12/909,165, filed Oct. 21, 2010, 35 pages.

Oroskar et al., U.S. Appl. No. 12/854,114, filed Aug. 10, 2010, 48 pages.

3rd Generation Partnership Project 2 "3GPP2", "Source-Controlled Variable-Rate Multimode Wideband Speech Codec (VMR-WB), Service Options 62 and 63 for Spread Spectrum Systems," 3GPP2 C.S0052-A, Version 1.0, Apr. 22, 2005, 198 pages.

TIA Standard, "Interoperability Test Specification for cdma2000® Air Interface," TIA-1036, Section 3.11, Jan. 2005, 4 pages.

TR45, "Inter-Operability Specification (IOS) for CDMA 2000 Access Network Interfaces," TIA/EIA/IS-2001-A, Sections 2.2.2.2, 3.4.1, 3.4.3.1.11, and 3.4.9, Jun. 2001, 24 pages.

Vargantwar et al., U.S. Appl. No. 12/815,700, filed Jun. 15, 2010, 41 pages.

Vargantwar et al., U.S. Appl. No. 12/815,709, filed Jun. 15, 2010, 42 pages.

Vargantwar et al., U.S. Appl. No. 12/847,198, filed Jul. 30, 2010, 36 pages.

Vondekamp et al., U.S. Appl. No. 11/535,870, filed Sep. 27, 2006, 29 pages.

Office Action for U.S. Appl. No. 11/535,870 dated Apr. 3, 2009, 14 pages.

Final Office Action for U.S. Appl. No. 11/535,870 dated Nov. 12, 2009, 22 pages.

Advisory Action for U.S. Appl. No. 11/535,870 dated Feb. 18, 2010, 14 pages.

Office Action for U.S. Appl. No. 12/853,730 dated Jan. 18, 2012, 13 pages.

Office Action for U.S. Appl. No. 12/815,700 dated Dec. 14, 2011, 9 pages.

Office Action for U.S. Appl. No. 12/815,709 dated Feb. 21, 2012, 5 pages.

Office Action for U.S. Appl. No. 13/044,794 mailed Jul. 18, 2012, 21 pages.

Office Action for U.S. Appl. No. 13/044,794 mailed Jun. 20, 2013, 11 pages.

Final Office Action for U.S. Appl. No. 13/044,794 mailed Jan. 3, 2013, 22 pages.

Office Action for U.S. Appl. No. 12/909,165 mailed Oct. 24, 2012, 15 pages.

Bhan et al., U.S. Appl. No. 12/261,229, filed Oct. 30, 2008, 55 pages.
Shah et al., U.S. Appl. No. 12/553,661, filed Sep. 3, 2009, 33 pages.
Oroskar et al., U.S. Appl. No. 12/558,359, filed Sep. 11, 2009, 36 pages.

Oroskar et al., U.S. Appl. No. 12/572,829, filed Oct. 2, 2009, 40 pages.

Oroskar et al., U.S. Appl. No. 12/690,629, filed Jan. 20, 2010, 38 pages.

Oroskar et al., U.S. Appl. No. 12/756,027, filed Apr. 7, 2010, 34 pages.

Oroskar et al., U.S. Appl. No. 12/776,287, filed May 7, 2010, 36 pages.

Oroskar et al., U.S. Appl. No. 12/786,174, filed May 24, 2010, 42 pages.

Oroskar et al., U.S. Appl. No. 12/786,184, filed May 24, 2010, 42 pages.

Oroskar et al., U.S. Appl. No. 12/854,119, filed Aug. 10, 2010, 54 pages.

Oroskar et al., U.S. Appl. No. 13/044,794, filed Mar. 10, 2011, 51 pages.

* cited by examiner

TRANSMISSION OF CHANNEL ASSIGNMENT MESSAGES BASED ON WIRELESS COVERAGE AREA CHARACTERISTICS

BACKGROUND

When assigning a traffic channel to a wireless communication device (WCD), a radio access network (RAN) may transmit more than one channel assignment message to the WCD. Each of these channel assignment messages may be transmitted at approximately the same time via a different wireless coverage area. In this way, the probability that the WCD receives at least one channel assignment message is increased. However, channel assignment messages may be transmitted on paging channels, and with a higher priority than paging messages. Thus, transmitting channel assignment messages via too many wireless coverage areas may cause paging messages to be lost or delayed.

OVERVIEW

Method, devices, and systems for transmission of channel assignment messages based on wireless coverage area characteristics are presented. In situations where transmitting multiple channel assignment messages is likely to cause paging messages to be lost or delayed, as well as in situations where doing so is unlikely to produce a significant benefit to a WCD or a RAN, the RAN may limit the number of channel assignment messages that it transmits to the WCD.

Thus, for example, when the paging channel utilization of a given wireless coverage area is high, the RAN may omit the given wireless coverage area from those through which the RAN transmits channel assignment messages to the WCD. Similarly, if the WCD receives a signal strength from the given wireless coverage area that is low, the RAN may also omit the given wireless coverage area from those through which the RAN transmits channel assignment messages to the WCD. In this way, the RAN avoids transmitting channel assignment messages via wireless coverage area when such transmission would either have a deleterious impact on other WCDs, or is unlikely to be successfully received.

Accordingly, in a first example embodiment, a RAN may define a first wireless coverage area and a second wireless coverage area. The RAN may determine that a WCD is to be assigned a traffic channel. In response to determining that the WCD is to be assigned the traffic channel, the RAN may obtain a first quality measurement of the first wireless coverage area and a second quality measurement of the second wireless coverage area. Both of these wireless coverage areas may be candidates for the RAN to transmit channel assignment messages to the WCD. The first and second quality measurements may be, for example, paging channel utilization measurements or signal strength measurements.

The RAN may determine that (i) the first quality measurement meets a given threshold and (ii) the second quality measurement does not meet the given threshold. Based on making this determination, the RAN may (i) assign the traffic channel to the WCD by transmitting a channel assignment message to the WCD via the second wireless coverage area, and (ii) not use the first wireless coverage area to assign the traffic channel.

While the first example embodiment determines whether to transmit channel assignment messages via particular wireless coverage areas based on quality measurements of these wireless coverage areas, other embodiments may consider an aggregate quality measurement across multiple wireless coverage areas within range of the WCD. For instance, a WCD may be within range of five wireless coverage areas. The RAN may typically transmit channel assignment messages via all five wireless coverage areas. However, if these five wireless coverage areas have an aggregate paging channel utilization that is very high (e.g., above 90%), the RAN may transmit a channel assignment message to the WCD via only one of these wireless coverage areas. If the aggregate paging utilization is slightly lower (e.g., between 80% and 90%), the RAN may transmit channel assignment messages to the WCD via one or two of the wireless coverage areas, and so on. If the aggregate paging channel utilization is sufficiently low (e.g., below 40%), the RAN may transmit channel assignment messages via up to five of the wireless coverage areas.

Accordingly, in a second example embodiment, a RAN may obtain an aggregate quality measurement of a plurality of wireless coverage areas. Each of these wireless coverage areas may be candidates for the RAN to transmit channel assignment messages to a WCD. The aggregate quality measurement may be, for example, an aggregate paging channel utilization measurement or an aggregate signal strength measurement.

If the obtained aggregate quality measurement meets a given threshold, the RAN may select a first extent of wireless coverage areas from the plurality. However, if the obtained aggregate quality measurement does not meet the given threshold, the RAN may instead select a second extent of wireless coverage areas from the plurality. The second extent may be greater than the first extent. Then, the RAN may transmit, to the WCD, channel assignment messages via the selected extent of wireless coverage areas.

In this way, the RAN determines when the paging channels of the wireless coverage areas within range of the WCD are congested, and mitigates that congestion by sending fewer channel assignment messages on these paging channels. Alternatively, the RAN determines when the signal strengths that the WCD receives from the wireless coverage areas are high, and sends channel assignment messages via fewer wireless coverage areas.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Network Architecture

Figure 1:
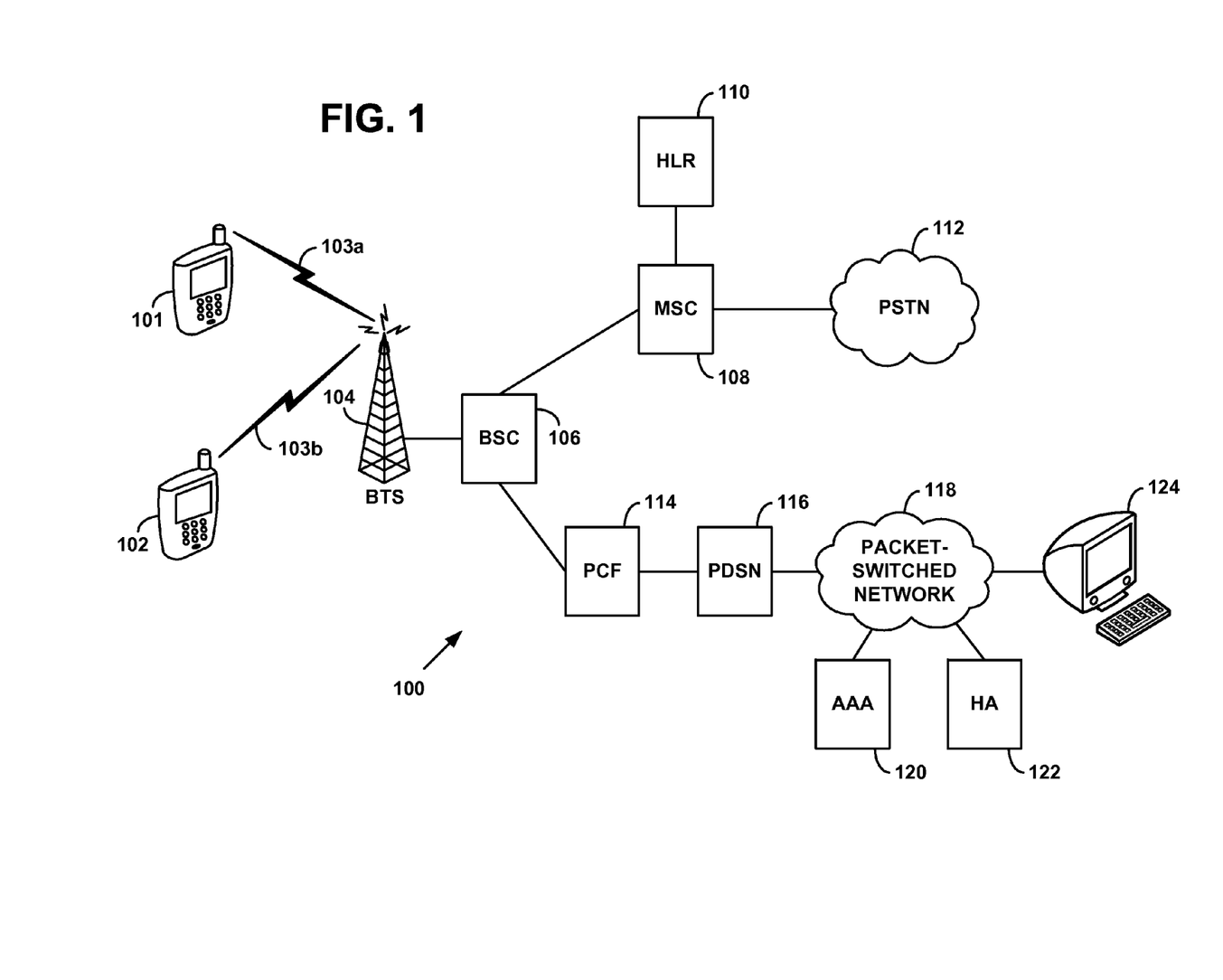
FIG. 1 depicts a RAN, in accordance with an example embodiment.

FIG. 1 is a simplified block diagram of a wireless communication system 100 in which example embodiments can be employed. WCD 101 may communicate over an air interface 103a with a base transceiver station (BTS) 104, which is, in turn, coupled to or integrated with a base station controller (BSC) 106. Similarly, WCD 102 may communicate over an air interface 103b with BTS 104. Transmissions over air interface 103a from BTS 104 to WCD 101 and over air interface 103b from BTS 104 to WCD 102 may represent "forward links" to the WCDs. Conversely, transmissions over air interface 103a from WCD 101 to BTS 104 and over air interface 103b from WCD 102 to BTS 104 may represent "reverse links" from the WCDs. Although FIG. 1 shows two WCDs, more or fewer WCDs may be present.

BSC 106 may be connected to a mobile switching center (MSC) 108. BSC 106, MSC 108, or both, may act to control assignment of air interface traffic channels, and may provide access to wireless circuit-switched services such as circuit-voice and circuit-data services. As represented by its connection to public-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of WCD registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a mobile Internet Protocol (mobile-IP) home agent (HA) 122, and a remote computer 124.

After acquiring a traffic channel over air interface 103a, WCD 101 may transmit a request to PDSN 116 for a connection to the packet data network. Then, following authentication of WCD 101 by AAA server 120, WCD 101 may be assigned an IP address by the PDSN or by HA 122, and may thereafter engage in packet-data communications with entities such as remote computer 124. Similar procedures may take place, via air interface 103b, for WCD 102.

Figure 2:
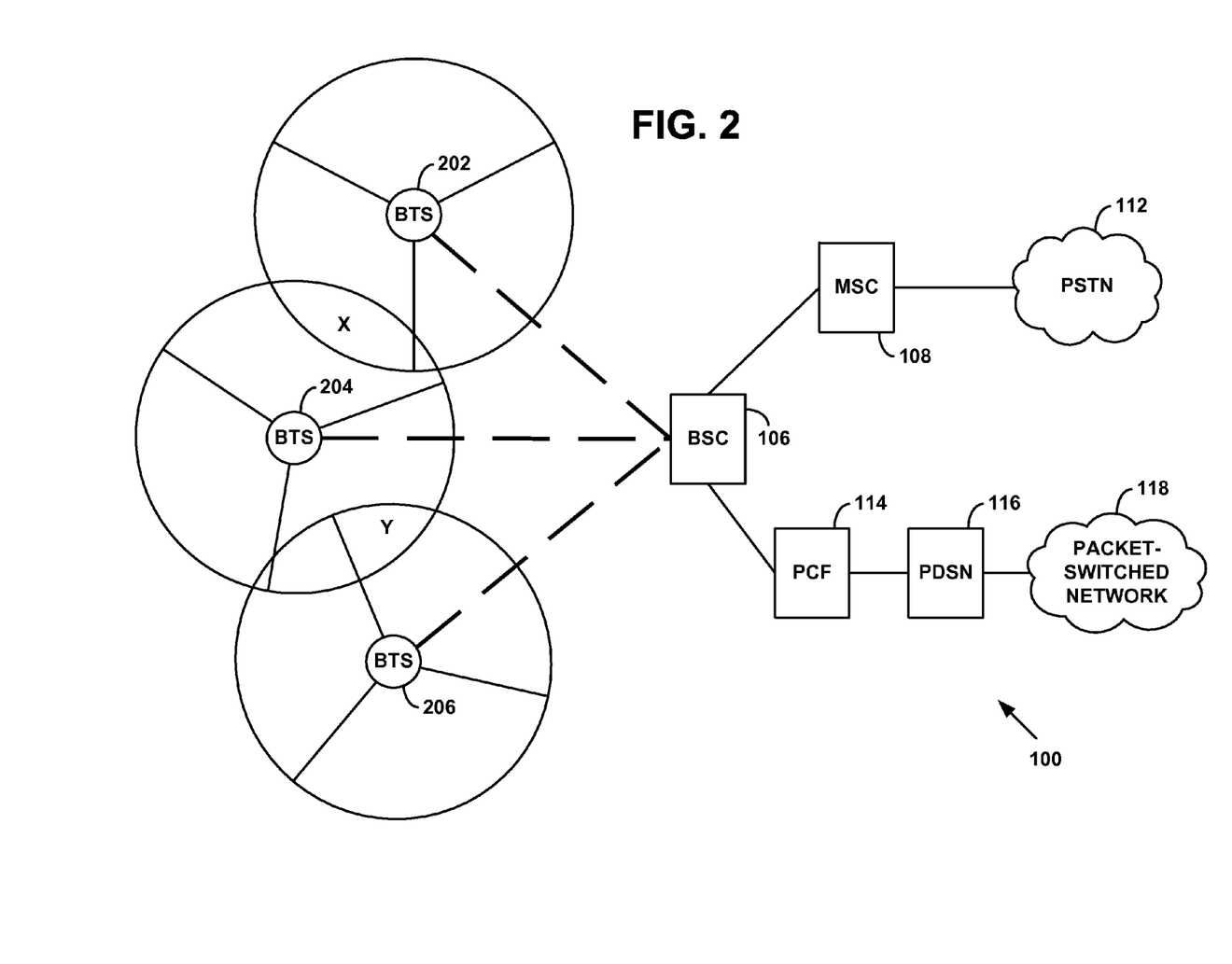
FIG. 2 depicts a RAN with several wireless coverage areas, in accordance with an example embodiment.

In practice, a BSC may serve multiple BTSs, each of which may define one or more wireless coverage areas. An example of such an arrangement is illustrated in FIG. 2, which shows BSC 106 in network 100 coupled with BTSs 202, 204, and 206. Each BTS is shown at the core of a respective circle representing wireless coverage, with each circle divided into three pie-shaped pieces representing individual wireless coverage areas. With this arrangement, a WCD may operate in any of the wireless coverage areas and can connect, via a serving BTS, with MSC 108 for circuit-based services and/or via PCF 114 and PDSN 116 for packet-based services. Note that the depiction of three wireless coverage areas per BTS in FIG. 2 is intended to be for purposes of example, and other numbers of wireless coverage areas per BTS are possible. Further, the relative positions of the BTSs and the relative angular orientations of the wireless coverage areas are also illustrative, and other arrangements may be used. Moreover, a BTS's overall wireless coverage may not be circular, and may take on other shapes and arrangements instead.

A WCD may transmit and receive control messages via more than one wireless coverage area. To illustrate how this may occur, FIG. 2 includes points X and Y. While in the vicinity of point X, a WCD may be able to transmit and receive control messages via wireless coverage areas of BTS 202 and BTS 204. Similarly, while in the vicinity of point Y, a WCD may be able to transmit and receive control messages via wireless coverage areas of BTS 204 and BTS 206. It should be noted that, in practice, a WCD located at or near points X or Y may be able to transmit and receive control messages via more than two wireless coverage areas.

In general, the depictions of both FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIGS. 1 and 2 should not be viewed as limiting with respect to the present invention. For instance, BSC 106 may be replaced by one or more radio network controllers (RNCs), and MSC 108 may be replaced, in whole or in part, by one or more softswitch and/or media gateway components.

Figure 3:
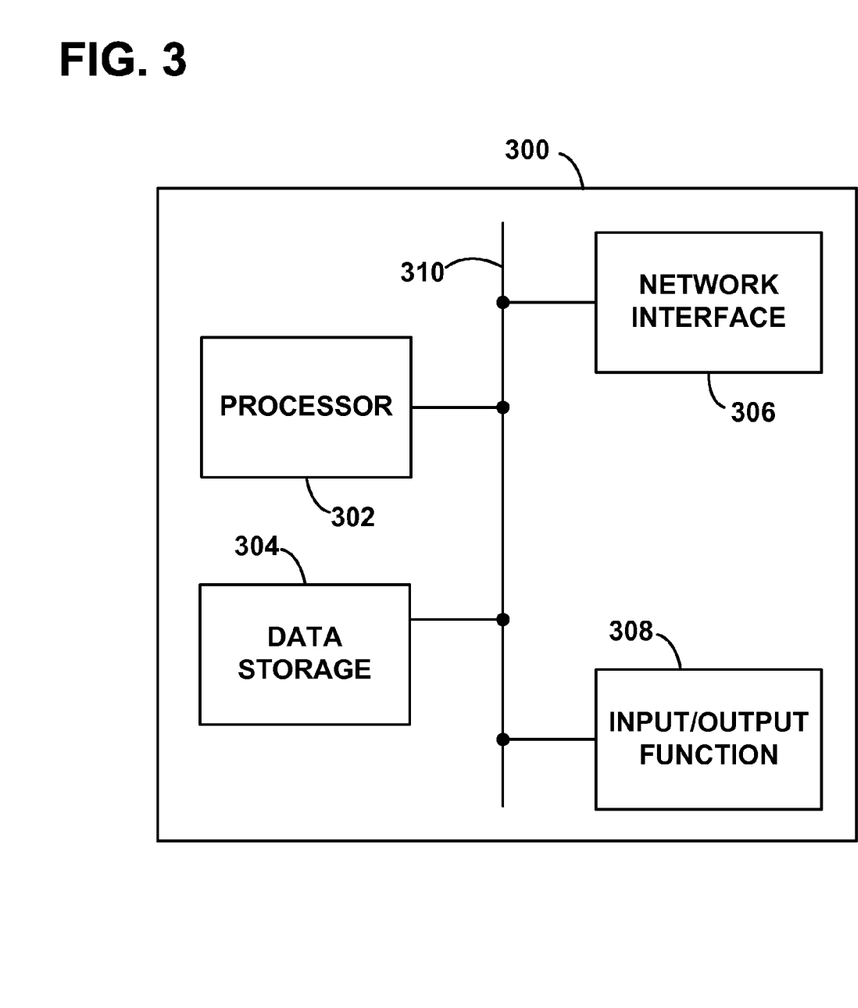
FIG. 3 is a block diagram of a RAN component, in accordance with an example embodiment.

FIG. 3 is a simplified block diagram exemplifying a RAN component 300, illustrating some of the functional elements that may be found in a RAN arranged to operate in accordance with the embodiments herein. RAN component 300 could be any type of device found in or associated with a RAN, such as a BTS, a BSC, or an MSC. For purposes of illustration, this specification may equate RAN component 300 to a BSC from time to time. Nonetheless, it should be understood that the description of RAN component 300 could apply to any component used for the purposes described herein.

RAN component 300 may include a processor 302, a data storage 304, a network interface 306, and an input/output function 308, all of which may be coupled by a system bus 310 or a similar mechanism. Processor 302 may include one or more CPUs, such as one or more general purpose processors and/or one or more dedicated processors (e.g., application specific integrated circuits (ASICs) or digital signal processors (DSPs), etc.)

Data storage 304, in turn, may comprise volatile and/or non-volatile data storage and can be integrated in whole or in part with processor 302. Data storage 304 may store program instructions, executable by processor 302, and data that is manipulated by these instructions to carry out the various methods, processes, or functions described herein. Alternatively, these methods, processes, or functions can be defined by hardware, firmware, and/or any combination of hardware, firmware and software. Therefore, data storage 304 may be a non-transitory computer-readable medium, having stored thereon program instructions that, if executed by a computing device, cause the computing device to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

Input/output function 308 may facilitate user interaction with example RAN component 300. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, example RAN component 300 may support remote access from another device, via network interface 306 or via another interface (not shown), such an RS-232 or USB port.

II. CDMA Communications

The present invention will be described by way of example with reference to Code Division Multiple Access (CDMA) communications. However, it should be understood that the invention can apply to other families of protocols now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a given Walsh code.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be assigned dynamically for use as traffic channels, i.e., to carry user communications such as email, web browsing, voice, video, and so on. Similarly, on the reverse link, one or more offsets of a CDMA code (i.e., offsets of a PN long code) may be reserved for defining control channels, such as access channels, and the remaining offsets may be assigned dynamically to WCDs for use as traffic channels.

When idle (i.e., not exchanging bearer traffic with the RAN), the WCD may register with a primary wireless coverage area, and listen to the paging channel of the primary wireless coverage area for incoming call indications, and other information, from the RAN. The RAN may transmit system parameter messages and/or neighbor list messages to the WCD via this primary paging channel. These messages may contain PN offsets of the pilot channels emitted by BTSs that define neighboring wireless coverage areas (e.g., wireless coverage areas defined by the RAN's BTSs or wireless coverage areas defined by nearby BTSs in different RANs). The WCD may measure the pilot channel signal strength it receives from each of these neighboring wireless coverage areas.

For example, the WCD may monitor the pilot signals that it receives, measuring signal strength in decibels (dB) for each as $E_c/I_o$, where $E_c$ is energy per CDMA chip for the pilot signal of a given wireless coverage area and $I_o$ is the total power received. Values of $E_c/I_o$ may range from 0 dB (very good signal strength) to −16 dB (very poor signal strength). It should be understood that $E_c/I_o$ measures a signal-to-noise ratio, but other methods of measuring signal strength, as well as other ranges of signal strength values, may be used.

If, for some period of time, WCD receives pilot channel signals from a neighboring wireless coverage area at a greater strength than the WCD receives pilot channel signals from the primary wireless coverage area, the WCD may hand off to the neighboring wireless coverage area. To do so, the WCD may stop listening to the primary wireless coverage area's paging channel and register with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD engages in a voice or data call, the WCD may use the primary wireless coverage area's paging channel and access channel to set up the call. For example, when an idle WCD originates a new outgoing call (i.e., the WCD is the caller), the WCD may transmit one or more origination, or probe, messages to the RAN via the access channel of the primary wireless coverage area. The RAN may respond by assigning a forward-direction traffic channel to the WCD, and transmitting, via the paging channel, an indication of this assignment (e.g., a Walsh code of the assigned traffic channel). This transmission may take the form of a channel assignment message directed to the WCD. Then, the WCD may use the assigned traffic channel for receiving bearer traffic for the voice or data call.

On the other hand, when an idle WCD is the recipient of a new incoming call (i.e., the WCD is the callee), the RAN may transmit a page request message to the WCD on the paging channel of the primary wireless coverage area. In response to receiving the page request message, the WCD may transmit, to the RAN, a page response message via the primary wireless coverage area's access channel. Similar to how outgoing calls are set up, the RAN may respond by assigning a forward-direction traffic channel to the WCD, and transmitting, via the paging channel, an indication of this assignment (e.g., a Walsh code of the assigned traffic channel) to the WCD in a channel assignment message. Then, the WCD may use the assigned traffic channel for receiving bearer traffic.

The WCD may transmit bearer data to the RAN on a reverse traffic channel by applying the WCD's assigned PN long code offset to a PN long code. The WCD may then modulate the bearer data according to the resulting point in the PN long code.

For purposes of simplicity, it is assumed herein that a "channel assignment message" is any type of message that can assign a traffic channel to a WCD. For instance, in CDMA networks, a RAN can assign a traffic channel to a WCD via either a "channel assignment message" (CAM) or an "enhanced channel assignment message" (ECAM). The channel assignment messages described herein include both of these types of messages, as well as any other message used for the same or a similar purpose.

Control messages, such as channel assignment messages, exchanged between a WCD and the RAN may be lost, delayed, or damaged due to distortion, interference, or attenuation on the air interface of the primary wireless coverage area. If such a message is lost, delayed, or otherwise not properly received by a WCD, the RAN may retransmit the message one or more times. However, there is no guarantee that the WCD will receive any of these retransmissions. Thus, in the presence of air interface distortion, interference, or attenuation, channel assignment may be delayed or may fail to take place.

In order to mitigate such occurrences, the RAN may transmit multiple channel assignment messages to the WCD. In some embodiments, the RAN transmits each channel assignment message via a different wireless coverage area. Thus, the RAN may transmit several channel assignment messages, perhaps one via the primary wireless coverage area, and several others via nearby wireless coverage areas. Each channel assignment message may contain the same or similar channel assignment information.

Figure 4:
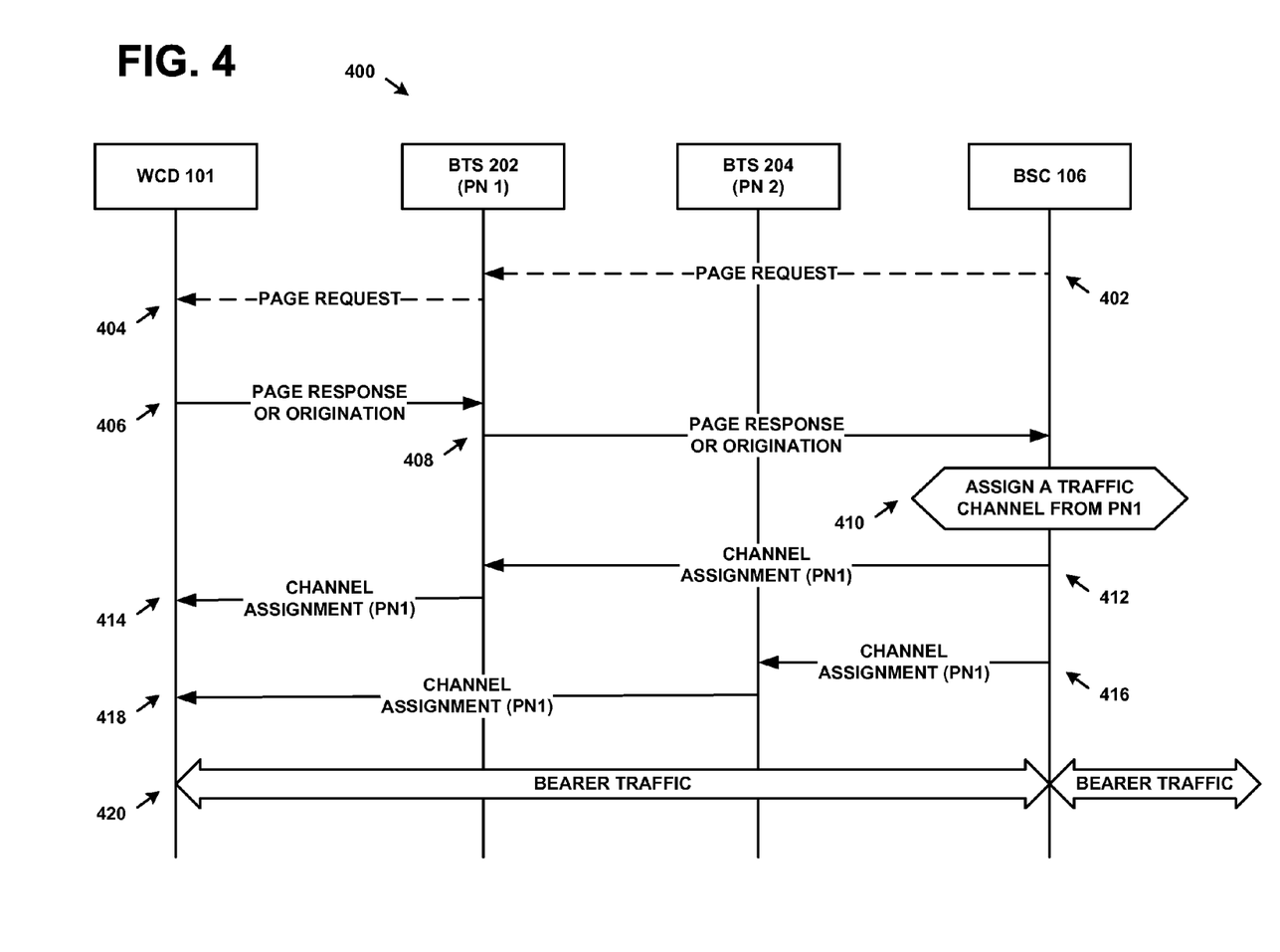
FIG. 4 is a message flow, in accordance with an example embodiment.

For purposes of illustration, FIG. 4 shows an example message flow 400 of a RAN transmitting channel assignment messages via multiple wireless coverage areas. FIG. 4 involves WCD 101, BTS 202, BTS 204, and BSC 106. BTS 202 defines a wireless coverage area with PN offset 1 ("PN 1"), and BTS 204 defines another wireless coverage area with PN offset 2 ("PN 2"). BTS 202 and BTS 204 are controlled by BSC 106. WCD 101 may be able to receive pilot channel signals of sufficient strength from both PN 1 and PN 2 such that WCD could communicate effectively via either of these wireless coverage areas. Without loss of generality, it is assumed that PN 1 is the primary wireless coverage area of WCD 101.

Preferably, WCD 101 reports, to BSC 106, measurements of the signal strengths at which WCD 101 receives the pilot channels of PN 1 and PN2. This reporting may occur through the transmission of radio environment reports or pilot strength measurement messages (PSMMs), or via a different type of message.

Steps 402 and 404 illustrate BSC 106, via BTS 202, transmitting an optional page request message to WCD 101. Such a page request message may be transmitted when WCD 101 is paged to answer an incoming voice call or to receive incoming data. Steps 406 and 408 illustrate WCD 101 transmitting a message via BTS 202 to BSC 106. This message may be a page response message transmitted on the access channel in response to the optional page request message. Alternatively, this message may be an origination message, also transmitted on the access channel, with which WCD 101 attempts to establish an outgoing voice or data call. Additional alternative message types may also be used for this purpose, and any such message may be transmitted on the access channel or another type of channel.

Regardless of whether an incoming or outgoing call is being established for WCD 101, at step 410, BSC 106 may assign a traffic channel to WCD 101. In a possible scenario, BSC 106 may assign a traffic channel from PN 1. When making the traffic channel assignment, BSC 106 may consider pilot channel signal strength measurements that it received from WCD 101. BSC 106 may use these received signal strengths, and/or other information, when determining from which wireless coverage area to assign a traffic channel. Thus, if BSC 106 determines that WCD 101 receives the pilot signal from PN 1 at a lower strength than that of PN 2, BSC 106 may instead assign a traffic channel from PN 2 to WCD 101.

At steps 412 and 414, BSC 106 may transmit a first channel assignment message via BTS 202 to WCD 101. The first channel assignment message may include a traffic channel assignment for PN 1. In other words, the first channel assignment message may instruct WCD 101 to use a particular Walsh code with PN 1. Similarly, at steps 416 and 418, BSC 106 may transmit a second channel assignment message via BTS 204 to WCD 101. The second channel assignment message may also include a traffic channel assignment for PN 1. By transmitting multiple channel assignment messages to WCD 101, the likelihood that WCD 101 receives at least one of these messages is increased. Regardless, at step 420, WCD 101 may begin transmitting and receiving bearer traffic via BTS 202 (using PN 1).

While message flow 400 shows only two channel assignment messages being transmitted to WCD 101, more or fewer channel assignment messages may be transmitted to WCD 101 without departing from the scope of the invention. Further, throughout message flow 400, the names of these messages are used for purposes of convenience and messages with other names may be used for similar purposes.

III. Limiting Channel Assignment Messages Based on Wireless Coverage Area Quality When the RAN transmits a channel assignment message via a wireless coverage area, the channel assignment message takes up a portion of the available capacity of the wireless coverage area's control channels. In some types of RAN technologies, such as CDMA, channel assignment messages may be transmitted on paging channels. Thus, channel assignment messages and paging messages may contend for paging channel capacity. Typically, channel assignment messages are given a higher priority than paging messages. As a result, paging messages may be delayed or discarded due to this contention.

While it is usually advantageous for the RAN to transmit multiple channel assignment messages when initiating a call to a WCD, if the RAN transmits too many channel assignment messages to the WCD, other WCDs may suffer. Accordingly, the RAN may base the number of channel assignment messages that it transmits to a WCD on the control channel utilization of one or more wireless coverage areas. In general, the relationship between the extent of channel assignment messages transmitted and control channel utilization should be inversely proportional. Thus, when control channel utilization is low, the RAN may transmit more channel assignment messages. However, when control channel utilization is high, the RAN may transmit fewer channel assignment messages. In other words, the RAN may attempt to trade off the desirability of transmitting multiple channel assignment messages with the need to allocate a sufficient amount of control channel resources to other types of control messages.

Additionally, when determining how many channel assignment messages to transmit, the RAN may also consider the strength of signals that the WCD receives from one or more wireless coverage areas that the RAN would use for these transmission. For instance, if the WCD receives signals from a given wireless coverage area at a relatively low strength, the WCD might be unlikely to properly receive channel assignment messages transmitted via this wireless coverage area. Accordingly, the RAN might choose not to transmit a channel assignment message via the given wireless coverage area.

Control channel capacity and/or the received signal strength of a wireless coverage area may be referred to as indications of wireless coverage area "quality." However, other factors may be used to determine a wireless coverage area's quality, and the term "quality" should not be limited to control channel capacity and/or the received signal strength.

Nonetheless, wireless coverage area quality can be used to determine the scope of channel assignment message transmission in at least two ways—from the perspective of individual wireless coverage areas, or in an aggregate fashion across multiple wireless coverage areas. The following sections describe examples of wireless coverage area quality, and embodiments using the example qualities as bases for influencing the number of channel assignment messages transmitted to a WCD.

a. Quality of Individual Wireless Coverage Areas

Figure 5:
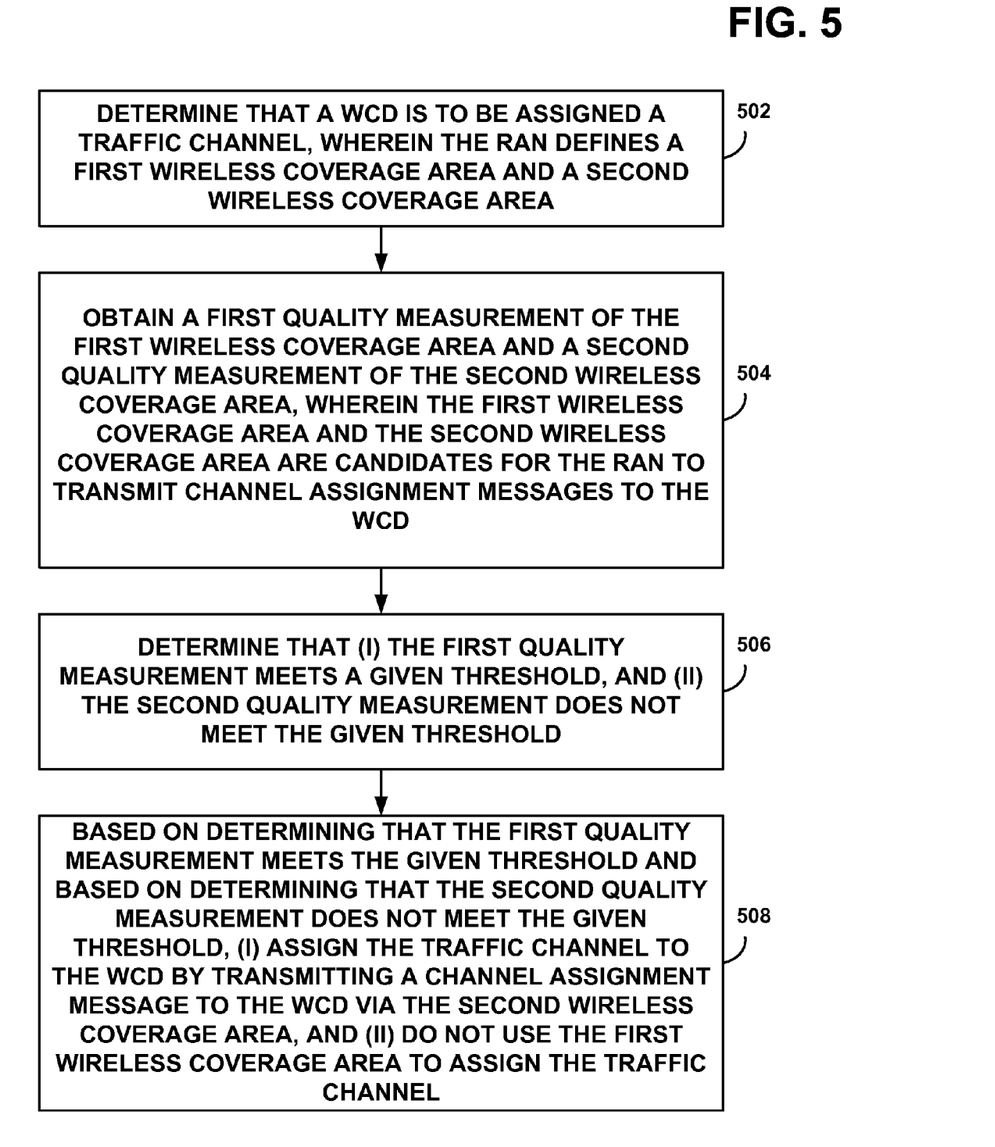
FIG. 5 is a first flow chart, in accordance with an example embodiment.

FIG. 5 provides an example embodiment through which a RAN component, such as a BSC, may determine whether to transmit channel assignment messages via particular wireless coverage areas based on the respective qualities of these wireless coverage areas. The RAN may define a first wireless coverage area and a second wireless coverage area. These wireless coverage areas may be candidates for the RAN to transmit channel assignment messages to a WCD, so that the WCD can engage in a voice or data call.

At step 502, the RAN may determine that the WCD is to be assigned a traffic channel. At step 504, in response to determining that the WCD is to be assigned the traffic channel, the RAN may obtain a first quality measurement of the first wireless coverage area and a second quality measurement of the second wireless coverage area. The first and second quality measurements may be based on the control channel capacities of the respective wireless coverage areas and/or the signal strengths of the respective wireless coverage areas, as received by the WCD.

Regardless, at step 506, the RAN may determine that (i) the first quality measurement meets a given threshold, and (ii) the second quality measurement does not meet the given threshold. At step 508, based on the outcome of this determination, the RAN may assign the traffic channel to the WCD by transmitting a channel assignment message to the WCD via the second wireless coverage area, and not use the first wireless coverage area to assign the traffic channel. The assigned traffic channel may be from the first wireless coverage area, the second wireless coverage area, or some other wireless coverage area.

As noted above, the first quality measurement may be based on a first control channel utilization of a first control channel from the first wireless coverage area (e.g., the first quality measurement may take the first control channel utilization into account), and the second quality measurement may be based on a second control channel utilization of a second control channel from the second wireless coverage area (e.g., the second quality measurement may take the second control channel utilization into account). Thus, in this scenario, the RAN may transmit the channel assignment message to the WCD via the second control channel. Additionally, the first and second control channels may be paging channels, and the given threshold may be a control channel utilization threshold.

Herein, a "utilization" may refer to a normalized or unnormalized measurement of resource usage. Thus, a utilization of a communication channel may be a portion of the channel that is used by traffic. For example, if, over a period of time, a given channel is used by traffic half of the time, the channel can be said to have a utilization of 50%. While utilizations may be expressed as percentages, utilizations may alternatively be expressed in other ways as well.

Determining that the first quality measurement meets the given threshold may include determining that the first control channel utilization is above the control channel utilization threshold. Additionally, determining that the second quality measurement does not meet the given threshold may include determining that the second control channel utilization is at or below the control channel utilization threshold.

For example, suppose that the control channel utilization threshold is 80%. Then, if the first control channel utilization is above 80%, the RAN will not use the first wireless coverage area to assign the traffic channel. Further, if the second control channel utilization is at or below 80%, the RAN may transmit a channel assignment message via the second wireless coverage area (e.g., the RAN may transmit the channel assignment message using the second control channel).

Additionally or alternatively, the first quality measurement may be based on a first signal strength with which the WCD receives signals from the first wireless coverage area (e.g., the first quality measurement may take the first signal strength into account), and the second quality measurement may be based on a second signal strength with which the WCD receives signals from the second wireless coverage area (e.g., the second quality measurement may take the second signal strength into account).

For instance, the RAN may also define a primary wireless coverage area that the RAN and the WCD use for communication of paging messages. The WCD may receive signals from the primary wireless coverage area at a primary signal strength. The RAN may base the determination of whether to use the first and/or the second wireless coverage area for transmission of channel assignment messages on a difference between the primary signal strength and the respective signal strengths of these wireless coverage areas.

Thus, the first quality measurement may be a first difference between the primary signal strength and the first signal strength. Further, determining that the first quality measurement meets the given threshold may involve the determining that the first difference is greater than a difference threshold. Similarly, the second quality measurement may be a second difference between the primary signal strength and the second signal strength. Then, determining that the second quality measurement does not meet the given threshold may involve determining that the second difference is less than or equal to the difference threshold.

TABLE 1

Signal strengths of wireless coverage areas.

| Wireless coverage area | Signal strength | Difference from primary signal strength |
|---|---|---|
| Primary | −4 dB | N/A |
| First | −14 dB | 10 dB |
| Second | −7 dB | 3 dB |

As an example, Table 1 displays sample signal strengths for the primary, first, and second wireless coverage areas, of −4 dB, −14 dB, and −7 dB, respectively. The first signal strength is subtracted from the primary signal strength to determine a first difference of 10 dB, while the second signal strength is subtracted from the primary signal strength to determine a second difference of 3 dB. Suppose that the difference threshold is 6 dB. Then the first difference meets the difference threshold, and the RAN does not transmit a channel assignment message via the first wireless coverage area. However, the second difference does not meet the difference threshold, and the RAN may transmit a channel assignment message via the second wireless coverage area.

b. Aggregate Quality of Multiple Wireless Coverage Areas

Figure 6:
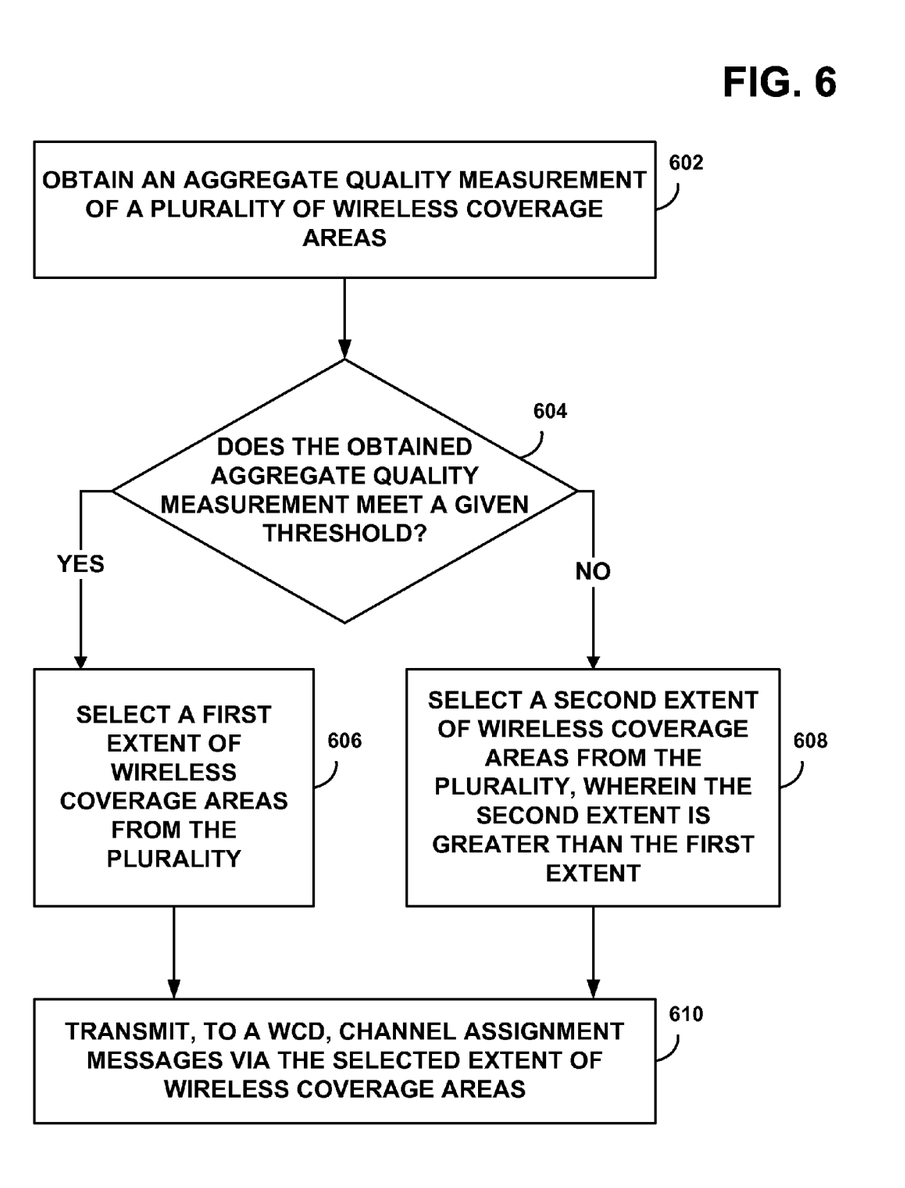
FIG. 6 is a second flow chart, in accordance with an example embodiment.

FIG. 6 illustrates another example embodiment. In accordance with the flow chart of FIG. 6, a RAN component may determine whether to transmit channel assignment messages via particular wireless coverage areas based on the aggregate qualities of these wireless coverage areas.

At step 602, the RAN may obtain an aggregate quality measurement of a plurality of wireless coverage areas. At step 604, the RAN may determine whether the obtained aggregate quality measurement meets a given threshold. If the obtained aggregate quality measurement meets the given threshold, then at step 606 the RAN may select a first extent of wireless coverage areas from the plurality. However, if the obtained aggregate quality measurement does not meet the given threshold, then at step 606 the RAN may select a second extent of wireless coverage areas from the plurality. The second extent may be greater than the first extent. As a possible example, the first extent of wireless coverage areas may consist of a small number of wireless coverage areas, such as one or two wireless coverage areas.

Then, the RAN may transmit channel assignment messages to the WCD via the selected extent of wireless coverage areas. In some embodiments, the RAN may transmit channel assignment messages to the WCD only via the selected extent of wireless coverage areas. Each channel assignment message may be transmitted via a different wireless coverage area. Thus, in some embodiments, the RAN may transmit exactly one channel assignment message per wireless coverage area.

The RAN may transmit the channel assignment messages via control channels (e.g., paging channels) of the selected wireless coverage areas. Therefore, the given threshold may be a control channel utilization threshold (e.g., a paging channel utilization threshold).

The aggregate quality measurement may be an aggregate control channel utilization measurement of all control channels in the plurality of wireless coverage areas. For instance, if there are a total of 30 control channels in 10 wireless coverage areas, and 15 of these control channels are in use (e.g., transferring control messages) on average, the aggregate control channel utilization measurement may be 50%. The RAN may measure the control channel utilization of each wireless coverage area periodically or from time to time, and the aggregate control channel utilization measurement may be based on one or more of these measurements, or on a weighted average of such measurements.

The RAN may adapt the number of selected wireless coverage areas based on the aggregate control channel utilization measurement. Thus, if the aggregate control channel utilization measurement is above the control channel utilization threshold, the RAN may transmit channel assignment messages via a smaller number of wireless coverage areas. However, if the aggregate control channel utilization measurement is at or below the control channel utilization threshold, the RAN may transmit channel assignment messages via a larger number of wireless coverage areas.

TABLE 2

Basing the maximum number of wireless coverage areas to use for transmitting channel assignment messages on control channel utilization.

| Aggregate Control Channel Utilization Range ($x$) | Max Wireless Coverage Areas |
| --- | --- |
| $x > 90\%$ | 1 |
| $90\% \geq x > 80\%$ | 2 |
| $80\% \geq x > 60\%$ | 3 |
| $60\% \geq x > 40\%$ | 5 |
| $40\% \geq x$ | Unlimited |

For example, Table 2 illustrates how the number of wireless coverage areas used for transmitting channel assignment messages to a WCD may be based on the aggregate control channel utilization of the wireless coverage areas. Table 2 uses multiple control channel utilization thresholds in order to show how the single control channel utilization threshold used in the process of FIG. 6 can be generalized.

According to Table 2, if the aggregate control utilization is above 90% (very high), the RAN may transmit a channel assignment message via at most one wireless coverage area. If the aggregate control channel utilization is above 80% and at or below 90% (fairly high), the RAN may transmit channel assignment messages via at most two wireless coverage areas, and so on. If the aggregate control channel utilization is at or below 40% (low), the RAN may transmit channel assignment messages via an unlimited number of wireless coverage areas. In practice, however, the number of wireless coverage areas may be limited to the number of wireless coverage areas in range of the WCD.

In an alternate embodiment, the aggregate quality measurement may be based on an aggregate measurement of signal strength with which the WCD receives signals from the plurality of wireless coverage areas, and the given threshold may be an aggregate signal strength threshold. The aggregate signal strength measurement may be based on the average of received signal strengths that the WCD measures from the plurality of wireless coverage areas. For instance, if there are three wireless coverage areas in the plurality and the WCD measures received signal strengths of −8 dB, −10 dB, and −12 dB from these respective wireless coverage areas, then the aggregate received signal strength may be −10 dB. Alternatively, the aggregate signal strength measurement may be based on a maximum or some other calculation of the individual received signal strengths.

If the aggregate signal strength measurement is above the aggregate signal strength threshold, the RAN may transmit channel assignment messages via a smaller number of wireless coverage areas. However, if the aggregate signal strength measurement is at or below the aggregate signal strength threshold, the RAN may transmit channel assignment messages via a larger number of wireless coverage areas.

TABLE 3

Basing the maximum number of wireless coverage areas to use for transmitting channel assignment messages on aggregate received signal strength.

| Aggregate Received Signal Strength Range ($x$) | Max Wireless Coverage Areas |
| --- | --- |
| $x > -6$ dB | 1 |
| $-6$ dB $\geq x > -8$ dB | 2 |
| $-8$ dB $\geq x > -10$ dB | 3 |
| $-10$ dB $\geq x > -12$ dB | 5 |
| $-12$ dB $\geq x$ | Unlimited |

Table 3 illustrates how the number of wireless coverage areas used for transmitting channel assignment messages to a WCD may be based on the aggregate received signal strength. Similar to Table 2, Table 3 also uses multiple thresholds, again to show how the single threshold used in the process of FIG. 6 can be generalized.

According to Table 3, if the aggregate received signal strength is above −6 dB (very high), the RAN may transmit a channel assignment message via at most one wireless coverage area. If the aggregate received signal strength is above −8 dB and at or below −6 dB (fairly high), the RAN may transmit channel assignment messages via at most two wireless coverage areas, and so on. If the aggregate received signal strength is at or below −12 dB (low), the RAN may transmit channel assignment messages via an unlimited number of wireless coverage areas. Again, in practice, the number of wireless coverage areas may be limited to the number of wireless coverage areas in range of the WCD.

It should be understood that the flow charts of FIGS. 5 and 6 are non-limiting embodiments. Thus, more or fewer steps than shown in FIGS. 5 and 6 may be used without departing from the scope of the invention. Additionally, any of these steps may be repeated one or more times, or may be omitted altogether. Moreover, these steps may occur in a different order than shown in FIGS. 5 and 6.

Further, these flow charts may be combined with one another, in whole or in part, also without departing from the scope of the invention. For instance, the RAN may follow the procedures of the flow chart of FIG. 6 to determine how many wireless coverage areas to use for transmitting channel assignment messages, and then follow the procedures of the flow chart of FIG. 5 to select individual wireless coverage areas through which to transmit the channel assignment messages.

IV. Conclusion

Example embodiments have been described above. Those skilled in the art will understand, however, that changes and modifications may be made to these embodiments without departing from the true scope and spirit of the invention, which is defined by the claims. It should also be understood that any form of enumeration in the claims is merely for purposes of clarity, and does not imply that steps or elements may occur or appear in a particular order.

What is claimed is:

1. A method comprising:
a radio access network (RAN) determining that a wireless communication device (WCD) is to be assigned a traffic channel, wherein the RAN defines a first wireless coverage area, a second wireless coverage area, and a third wireless coverage area;
in response to determining that the WCD is to be assigned the traffic channel, the RAN obtaining a first quality measurement of the first wireless coverage area, a second quality measurement of the second wireless coverage area, and a third quality measurement of the third wireless coverage area, wherein the first wireless coverage area, the second wireless coverage area, and the third wireless coverage area are candidates for the RAN to transmit channel assignment messages to the WCD for assignment of the traffic channel;
the RAN determining that (i) the first quality measurement meets a given threshold, (ii) the second quality measurement does not meet the given threshold, and (iii) the third quality measurement does not meet the given threshold; and
based on determining that the first quality measurement meets the given threshold, the second quality measurement does not meet the given threshold, and that the third quality measurement does not meet the given threshold, the RAN (i) assigning the traffic channel to the WCD by transmitting channel assignment messages to the WCD via the second wireless coverage area and the third wireless coverage area, and (ii) determining to not transmit a channel assignment message to the WCD via the first wireless coverage area for assignment of the traffic channel.

2. The method of claim 1, wherein the first quality measurement comprises a first control channel utilization of a first control channel from the first wireless coverage area, wherein the second quality measurement comprises a second control channel utilization of a second control channel from the second wireless coverage area, wherein the given threshold comprises a control channel utilization threshold, and wherein the RAN transmits the channel assignment messages to the WCD via at least the second control channel.

3. The method of claim 2, wherein the first and second control channels are paging channels.

4. The method of claim 2, wherein determining that the first quality measurement meets the given threshold comprises determining that the first control channel utilization is above the control channel utilization threshold, and wherein determining that the second quality measurement does not meet the given threshold comprises determining that the second control channel utilization is at or below the control channel utilization threshold.

5. The method of claim 1, wherein the first quality measurement is based on a first signal strength with which the WCD receives signals from the first wireless coverage area, and wherein the second quality measurement is based on a second signal strength with which the WCD receives signals from the second wireless coverage area.

6. The method of claim 5, wherein the RAN also defines a primary wireless coverage area, wherein the RAN and the WCD use the primary wireless coverage area for communication of paging messages, wherein the WCD receives signals from the primary wireless coverage area at a primary signal strength, and wherein the given threshold is a difference threshold between two signal strengths, the method further comprising:
the RAN determining the first quality measurement as a first difference between the primary signal strength and the first signal strength, wherein determining that the first quality measurement meets the given threshold comprises the determining that the first difference is greater than the difference threshold; and
the RAN determining the second quality measurement as a second difference between the primary signal strength and the second signal strength, wherein the determining that the second quality measurement does not meet the given threshold comprises determining that the second difference is less than or equal to the difference threshold.

7. A method comprising:
a radio access network (RAN) obtaining an aggregate quality measurement of a plurality of wireless coverage areas;
if the obtained aggregate quality measurement meets a given threshold, the RAN selecting a first extent of wireless coverage areas from the plurality, wherein the first extent of wireless coverage areas comprises at least two wireless coverage areas;
if the obtained aggregate quality measurement does not meet the given threshold, the RAN selecting a second extent of wireless coverage areas from the plurality, wherein the second extent is greater than the first extent; and
the RAN transmitting, to a wireless communication device (WCD), channel assignment messages via each of the selected extent of wireless coverage areas.

8. The method of claim 7, wherein the RAN transmits the channel assignment messages via respective control channels of the selected extent of wireless coverage areas, wherein the aggregate quality measurement is an aggregate control channel utilization measurement of all control channels in the plurality of wireless coverage areas, and wherein the given threshold is a control channel utilization threshold.

9. The method of claim 8, wherein the control channels are paging channels.

10. The method of claim 8, wherein the aggregate control channel utilization measurement meeting the control channel utilization threshold comprises the aggregate control channel utilization measurement being above the control channel utilization threshold, and wherein the aggregate control channel utilization measurement not meeting the control channel utilization threshold comprises the aggregate control channel utilization measurement being at or below the control channel utilization threshold.

11. The method of claim 7, wherein the aggregate quality measurement is based on an aggregate signal strength measurement with which the WCD receives signals from the plurality of wireless coverage areas, and wherein the given threshold is an aggregate signal strength threshold.

12. The method of claim 11, wherein the aggregate signal strength measurement meeting the aggregate signal strength threshold comprises the aggregate signal strength measurement being above the aggregate signal strength threshold, and wherein the aggregate signal strength measurement not meeting the aggregate signal strength threshold comprises the aggregate signal strength measurement being at or below the aggregate signal strength threshold.

13. The method of claim 7, wherein each channel assignment message is transmitted via different wireless coverage areas of the selected extent.

14. An article of manufacture including a non-transitory computer-readable medium, having stored thereon program instructions that, when executed by a radio access network (RAN), cause the RAN to perform operations comprising:
  determining that a wireless communication device (WCD) is to be assigned a traffic channel, wherein the RAN defines a first wireless coverage area, a second wireless coverage area, and a third wireless coverage area;
  in response to determining that the WCD is to be assigned the traffic channel, obtaining a first quality measurement of the first wireless coverage area, a second quality measurement of the second wireless coverage area, and a third quality measurement of the third wireless coverage area, wherein the first wireless coverage area, the second wireless coverage area, and the third wireless coverage area are candidates for the RAN to transmit channel assignment messages to the WCD for assignment of the traffic channel;
  determining that the first quality measurement meets a given threshold, that the second quality measurement does not meet the given threshold, and that the third quality measurement does not meet the given threshold; and
  based on determining that the first quality measurement meets the given threshold, that the second quality measurement does not meet the given threshold, and that the third quality measurement does not meet the given threshold, (i) assigning the traffic channel to the WCD by transmitting channel assignment messages to the WCD via the second wireless coverage area and the third wireless coverage area, and (ii) determining to not transmit a channel assignment message to the WCD via the first wireless coverage area for assignment of the traffic channel.

15. The article of manufacture of claim 14, wherein the first quality measurement comprises a first control channel utilization of a first control channel from the first wireless coverage area, wherein the second quality measurement comprises a second control channel utilization of a second control channel from the second wireless coverage area, wherein the given threshold comprises a control channel utilization threshold, and wherein the RAN transmits the channel assignment messages to the WCD via at least the second control channel.

16. The article of manufacture of claim 15, wherein the first and second control channels are paging channels.

17. The article of manufacture of claim 15, wherein determining that the first quality measurement meets the given threshold comprises determining that the first control channel utilization is above the control channel utilization threshold, and wherein determining that the second quality measurement does not meet the given threshold comprises determining that the second control channel utilization is at or below the control channel utilization threshold.

18. The article of manufacture of claim 14, wherein the first quality measurement is based on a first signal strength with which the WCD receives signals from the first wireless coverage area, and wherein the second quality measurement is based on a second signal strength with which the WCD receives signals from the second wireless coverage area.

19. The article of manufacture of claim 18, wherein the RAN also defines a primary wireless coverage area, wherein the RAN and the WCD use the primary wireless coverage area for communication of paging messages, wherein the WCD receives signals from the primary wireless coverage area at a primary signal strength, wherein the given threshold is a difference threshold between two signal strengths, and wherein the program instructions, if executed by the RAN, cause the RAN to perform operations further comprising:
  determining the first quality measurement as a first difference between the primary signal strength and the first signal strength, wherein determining that the first quality measurement meets the given threshold comprises the determining that the first difference is greater than the difference threshold; and
  determining the second quality measurement as a second difference between the primary signal strength and the second signal strength, wherein the determining that the second quality measurement does not meet the given threshold comprises determining that the second difference is less than or equal to the difference threshold.

* * * * *